United States Patent
Zollitsch et al.

[19]

[11] Patent Number: 6,039,905
[45] Date of Patent: *Mar. 21, 2000

[54] APPARATUS AND METHOD FOR GRANULATING PLASTIC STRANDS

[75] Inventors: Ludwig Zollitsch, Korntal; Ulrich Kreuz, Erdmannhausen, both of Germany

[73] Assignee: C.F.Scheer & Cie GmbH & Co., Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/817,824

[22] PCT Filed: Nov. 7, 1995

[86] PCT No.: PCT/EP95/04382

§ 371 Date: Jul. 23, 1997

§ 102(e) Date: Jul. 23, 1997

[87] PCT Pub. No.: WO96/14195

PCT Pub. Date: May 17, 1996

[30] Foreign Application Priority Data

Nov. 7, 1994 [DE] Germany ............................. 44 39 774

[51] Int. Cl.⁷ ............................. B29C 47/00; B29C 47/34
[52] U.S. Cl. ........................... 264/143; 264/180; 425/71; 425/308; 425/DIG. 230
[58] Field of Search ............................. 425/71, 114, 308, 425/DIG. 230; 264/143, 234, 237, 141, 148, 180, 204

[56] References Cited

U.S. PATENT DOCUMENTS

| | | | |
|---|---|---|---|
| Re. 33,492 | 12/1990 | Hunke | 425/72.1 |
| 3,250,834 | 5/1966 | Collins | 264/143 |
| 4,180,539 | 12/1979 | Clarke | 264/143 |
| 4,340,342 | 7/1982 | Kim | 264/143 |
| 4,413,965 | 11/1983 | Kinoshita et al. | 264/143 |
| 5,182,115 | 1/1993 | Nogossek et al. | 425/71 |
| 5,310,515 | 5/1994 | Jurgen et al. | 264/143 |
| 5,441,394 | 8/1995 | Keilert et al. | 425/71 |
| 5,474,435 | 12/1995 | Hunke | 425/71 |
| 5,628,947 | 5/1997 | Keilert | 425/71 |

FOREIGN PATENT DOCUMENTS

| | | | |
|---|---|---|---|
| 598753 | 5/1960 | Canada | 264/143 |
| 57-49515 | 3/1982 | Japan | 425/71 |
| 61-68204 | 4/1986 | Japan | 425/71 |
| 62-270306 | 11/1987 | Japan | 425/71 |

*Primary Examiner*—David A. Simmons
*Assistant Examiner*—Robert A. Hopkins
*Attorney, Agent, or Firm*—Bacon & Thomas, PLLC

[57] ABSTRACT

A novel apparatus is described for granulating plastic strands (4) which emerge from nozzles (3) in molten form and are supplied to a following, downward inclined runoff channel (1) in which the plastic strands are transported by a liquid stream, in particular water stream. Further the apparatus has a dewatering zone (1b) for the plastic strands (4) and a granulator (6) disposed after this dewatering zone. Between the dewatering zone (1b) and the granulator (6) there is at least one tempering zone (9) comprising a rigid, unmoving channel (15) and integrated transport rolls (16) for the plastic strands (4) and having a length such that the temperature differences of the plastic strands (4) across their cross section are largely equalized during their holding time in the tempering zone (9).

After the plastic strands (4) have been transported through the tempering zone (9) they are introduced into the granulator (6) in which the strands are granulated by one or more knife assemblies and then discharged as corresponding plastic granules.

24 Claims, 1 Drawing Sheet

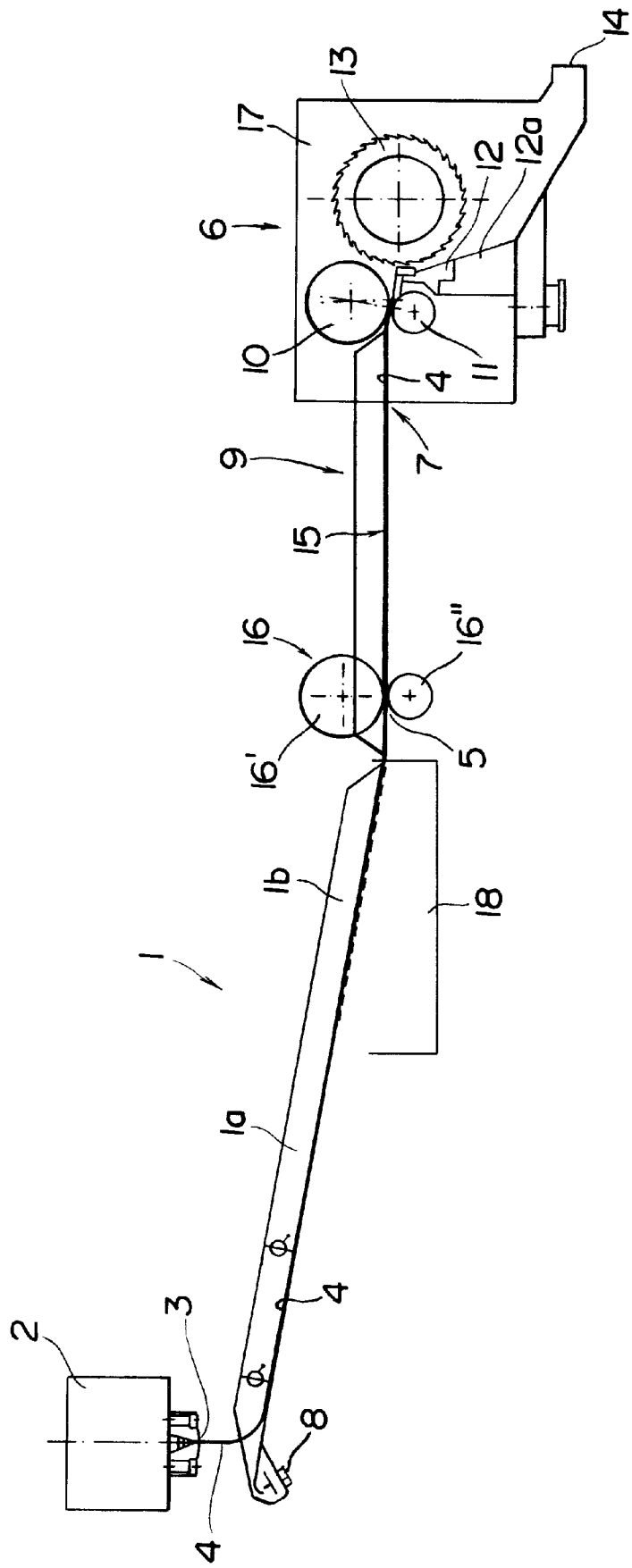

APPARATUS AND METHOD FOR GRANULATING PLASTIC STRANDS

BACKGROUND OF THE INVENTION

1. Field of the Invention

This invention relates to an apparatus and method for granulating plastic strands that emerge from nozzles in molten form and are supplied to a following, downward inclined runoff channel in which the plastic strands are transported by a liquid stream, in particular water stream, the apparatus further having a dewatering zone for the plastic strands and a granulator disposed after said dewatering zone for granulating the solidified plastic strands with the aid of at least one knife assembly.

2. Description of the Related Art

U.S. Pat. No. 5,182,115 discloses an apparatus for cooling, drying and granulating strands emerging from nozzles in molten form having a runoff channel disposed with its receiving-side end below the nozzles, and further having a device for producing a coolant stream on the runoff channel, while the runoff channel is followed by a granulator and furthermore a dewatering zone is disposed in the runoff channel before the discharge-side end, the runoff channel being provided in said dewatering zone with openings for free passage of the coolant.

In addition the runoff channel in this known apparatus is provided in its bottom in the area after the dewatering zone with admission nozzles for a gas or air stream over such a length and so close together that the strands are guided for removal of residual water along the runoff channel in largely frictionless fashion with respect to the bottom into the granulator disposed at its discharge-side end with a degree of dryness permitting immediate processing. This granulator has essentially two draw-in rolls for the plastic strands one above the other within a corresponding housing, further a knife roll cooperating with a corresponding counterknife. This knife roll and the counterknife granulate the plastic strands supplied by the draw-in rolls, and the granules thus produced by the granulator fall out through a discharge shaft for further processing.

In addition U.S. Pat. No. 4,180,539 discloses an apparatus of the above-defined type wherein the runoff channel is followed by an upward inclined dewatering and drying zone for the plastic strands that consists essentially of a circulating, endless and latticed conveyer belt on which the plastic strands leaving the runoff channel and thereby entraining at least part of the liquid stream are transported further toward the granulator. Above this circulating latticed conveyer belt a number of air nozzles are disposed for directing relatively sharp air jets ("air knives") onto the surface of the plastic strands. These air knives serve to dry the strands on their surfaces during transportation, whereby they blow away the water sticking thereto and remove it downward through the lattice belt. The latticed formation of the transport belt is necessary in the known apparatus of U.S. Pat. No. 4,180,539 in particular because relatively sharp air jets are directed onto the strands from above so that the air must likewise be removed downward through the lattice belt since the strands would otherwise not have the right contact pressure on the surface of the lattice belt; the strands subjected to the air knives would instead "fly up" and "swirl around" as it were. In addition, the known dewatering and drying zone ensures only a dewatering and drying process with respect to the strand surfaces while the interior of the strands still has an elevated temperature compared to the surface, so that the plastic strands entering the granulator directly after the dewatering and drying zone are not yet equalized in their temperature profile.

It is fundamentally necessary, however, that the plastic strands to be processed into granules be neither too soft nor too brittle when they are supplied to the knife roll of the granulator. In view of this requirement and also because of the extremely different properties of the plastics marketed in granular form, these properties ranging from "very elastic" to "extremely brittle", the cooling devices used between an extruder and a granulator in known apparatuses are already adapted by the manufacturer to the type of plastic later to be processed in order to ensure that the newly extruded plastic strands are cooled with such an intensity that they have the desired strength properties when they reach the knife roll of the granulator. When processing certain plastics, in particular glass fiber-reinforced plastics, one requires that the granulating temperature be over about 100° C., whereby the temperature profile should be as homogeneous as possible across the strand cross section. The same requirement also holds quite generally for example in the processing of plastics that are fundamentally relatively poor heat conductors.

In the apparatus known from U.S. Pat. No. 4,180,539 the dewatering and drying process does not permit the plastic strands to be given a homogeneous temperature distribution across the entire strand cross section before they enter the granulator, because the dewatering and drying process concentrates in particular on the strand surfaces.

SUMMARY OF THE INVENTION

In view of the above-described facts and disadvantages in known apparatuses for cooling and granulating plastic strands, the present invention is based on the problem of providing an improved apparatus of the above-defined type that is designed in such a way as to ensure that the strands entering the granulator have a temperature required for their further processing and in particular a virtually homogeneous temperature profile across the strand cross section.

This problem is solved according to the invention in an apparatus of the above-defined type by disposing at least one tempering zone between the dewatering zone and the granulator, said tempering zone comprising a rigid, unmoving channel and integrated transport rolls for the strands and having a length such that the temperature differences of the strands across their cross section are largely equalized during the holding time in the tempering zone.

This design makes it in particular possible to control the holding time of the plastic strands within the tempering zone in accordance with the transport speed adjusted for the transport rolls which form an integrated part of the tempering zone or the corresponding channel.

The inventive design of the apparatus for granulating plastic strands yields the essential advantage that this apparatus has a tempering zone with its own transport function so that in particular upon a start the strands are automatically "threaded" into the granulator.

The tempering zone provided according to the invention can be aligned essentially horizontally, but it can also be provided with an either downward or upward inclination to the horizontal toward the granulator.

Finally the channel of the tempering zone can be formed as a vibrating channel in order to strengthen and support the desired effect of temperature equalization within the plastic strands.

The inventive design results in a self-transporting temperature equalizing zone with a threading function within the apparatus for granulating these plastic strands.

BRIEF DESCRIPTION OF THE DRAWINGS

The method according to the invention comprises the steps of: supplying the molten strands to a downwardly inclined runoff channel; cooling and transporting the plastic strands within the runoff channel by a water stream; dewatering the plastic strands in a dewatering zone of the runoff channel; equalizing temperature differences of the plastic strands across a cross section thereof at a temperature over about 100° C. in a tempering zone following the dewatering zone; and granulating the plastic strands with a granulator disposed after the tempering zone.

The invention will be explained more closely in the following using an example, reference being made to the enclosed drawing.

DETAILED DESCRIPTION OF THE PREFERRED EMBODIMENTS

The single FIGURE shows a schematic side view of an apparatus for cooling and granulating plastic strands in its operating position.

This apparatus has schematically shown nozzle assembly 2 which is supplied in a way not specified here but known in the art with molten thermoplastic plastic which is then pressed out of nozzle 3 disposed below. Normally a plurality of such nozzles 3 are located in a row side by side below nozzle assembly 2.

The FIGURE shows the operating position of the apparatus in which plastic strands 4 emerging from nozzles 3 first pass onto the initial area of inclined runoff channel 1 which is provided with cooling and transport water feed pipe 8 at its upper end shown on the left in the FIGURE Runoff channel 1 divided functionally into a first channel portion, cooling zone 1a, and a second portion, dewatering zone 1b, guides supplied plastic strands 4 in parallel arrangement with the aid of the supplied cooling and transport water and by reason of its inclined arrangement further toward tempering zone 9 directly following dewatering zone 1b and disposed in the area between runoff channel 1 and granulator 6 shown on the right.

Tempering zone 9 serving to equalize temperature differences within plastic strands 4 consists essentially of rigid, unmoving channel 15 and transport roll system 16 integrated into channel 15 and having lower feed roll 16" and upper counterpressure roll 16' for further transporting plastic strands 4 coming from runoff channel 1 toward granulator 6 following tempering zone or temperature equalizing zone 9.

Transport roll system 16 is disposed essentially at the beginning of channel 15, whereby gap or nip 5 between lower feed roll 16" and upper counterpressure roll 16' has a separation height such that strands 4 entering gap 5 are given a feeding force toward granulator 6 by means of frictional engagement but without essential deformation. Gap or nip 5 of pair of rolls 16', 16" is located approximately at the height of the bottom of channel 15.

In the shown example, the length of tempering zone 9 is approximately equal to the length of runoff channel 1, but tempering zone 9 can preferably also be longer than runoff channel 1 provided that its minimum length is such that the temperature differences of each of the plastic strands across their respective cross sections are largely equalized.

Granulator 6 has housing 17 provided on its side facing tempering zone 9 with admission opening 7. Admission opening 7 receives the associated end area of channel 15 such that homogeneously solidified plastic strands 4 transported further thereon are introduced into granulator 6 with a self-threading effect, as it were.

Within housing 17 of granulator 6 there are two draw-in rolls for plastic strands 4, upper draw-in roll 10 and lower draw-in roll 11. Draw-in rolls 10 and 11 draw strand 4 now gradually leaving tempering zone 9 further into granulator 6 and guide it finally to rotating shearing knife 13 cooperating with anvil knife 12 disposed on knife holder 12a. This knife assembly granulates supplied plastic strands 4, the resulting plastic granules leaving housing 17 at outlet 14. In the area of dewatering zone 1b a gravimetric preliminary dewatering takes place, the water being collected by collecting box 18 below dewatering zone 1b.

Tempering zone 9 is aligned essentially horizontally in the shown example, but it is also possible to provide tempering zone 9 with an either downward or upward inclination to the horizontal toward granulator 6, this being omitted in the drawing for simplicity's sake.

Further, it is possible to give at least channel 15 of tempering zone 9 a vibrating design such that plastic strands 4 are set vibrating during their further transport through tempering zone 9.

The design of the granulating apparatus according to the present invention permits plastic strands 4 transported from tempering zone 9 toward granulator 6 to reach admission opening 7 of granulator housing 17 with the desired homogeneous temperature or degree of solidification across the strand cross sections, virtually without regard for the type of plastic primarily used. Plastic strands 4 now have a rigidity such that they can be threaded automatically into granulator 6 and then granulated easily with the aid of the knife assembly therein. The homogeneous temperature profile of the strands yields high-quality granules with a perfect cut edge and low dust content over a long production time.

We claim:

1. An apparatus for granulating plastic strands (4) which emerge from nozzles (3) in molten form and are supplied to a following, downward inclined runoff channel (1) in which the plastic strands are transported by a water stream, the apparatus further having a dewatering zone (1b) for the plastic strands (4) and a granulator disposed after the dewatering-zone (6) for granulating the solidified plastic strands (4), wherein between the dewatering zone (1b) and the granulator (6) there is provided at least one temperature equalizing zone (9) comprising a temperature equalizing channel (15) arranged to cool the strands without adding external heat, the temperature equalizing zone having a minimum length such that the temperature differences of each of the plastic strands (4) across their respective cross section are largely equalized during their holding time in the temperature equalizing zone (9) in the absence of external heat to such an extent that they have a homogeneous degree of solidification across their cross section when entering into the granulator (6), and wherein a transport roll system (16) having a gap (5) is provided, said transport roll system engaging and further transporting the plastic strands (4) coming from the runoff channel (1) toward the granulator (6).

2. The apparatus of claim 1 wherein the length of the temperature equalization zone (9) is at least equal to or greater than the length of the runoff channel (1).

3. Apparatus according to claim 1, wherein the transport roll system (16) is disposed essentially at the beginning of the temperature equalizing channel (15).

4. Apparatus according to claim 1, wherein the transport roll system (16) is integrated in the temperature equalizing channel (15).

5. Apparatus according to claim 1, wherein the transport roll system (16) comprises an opposing pair of rolls (16', 166"), the gap (5) of the pair of rolls (16', 16") having a height such that the strands (4) are frictionally engaged and given a feeding force toward the granulator (6) by the rolls without essential deformation, said gap (5) being located approximately at the height of a bottom of the temperature equalizing channel (15).

6. Apparatus according to claim 1, wherein the temperature equalizing channel (15) is aligned essentially horizontally.

7. Apparatus according to claim 1, wherein the temperature equalizing channel (15) is disposed with an upward inclination to the horizontal toward the granulator (6).

8. Apparatus according to claim 1, wherein the temperature equalizing channel (15) is of vibrating design.

9. Apparatus according to claim 1, wherein the length of the temperature equalizing channel (15) is such that the equalized temperature of the plastic strands (4) across each strand's cross section is over 100° C. during each strand's holding time in the temperature equalization zone (9).

10. Apparatus for granulating plastic strands (4) which emerge from nozzles (3) in molten form and are supplied to a following, downward inclined runoff channel (1) in which the plastic strands are transported by a water stream, the apparatus further having a dewatering zone (1b) for the plastic strands (4) and a granulator disposed after the dewatering zone (1b) for granulating the solidified plastic strands (4), wherein between the dewatering zone (1b) and the granulator (6) there is provided at least one temperature equalizing zone (9) comprising a temperature equalizing channel (15) arranged to cool the strands without adding external heat, the temperature equalizing zone (9) being at least equal to or greater than the length of the runoff channel (1) and wherein a transport roll system (16) having a gap (5) is provided said transport roll system engaging and further transporting the plastic strands (4) coming from the runoff channel (1) toward the granulator (6).

11. Apparatus according to claim 10, wherein the transport roll system (16) is disposed essentially at the beginning of the temperature equalizing channel (15).

12. Apparatus according to claim 10, wherein the transport roll system (16) is integrated in the temperature equalizing channel (15).

13. Apparatus according to claim 10, wherein the transport roll system (16) comprises an opposing pair of rolls (16', 16"), the gap (5) of the pair of rolls (16', 16") having a height such that the strands (4) are engaged frictionally and given a feeding force toward the granulator (6) by the rolls without essential deformation, the gap (5) being located approximately at the height of a bottom of the temperature equalizing channel (15).

14. Apparatus according to claim 10, wherein the temperature equalizing channel (15) is aligned essentially horizontally.

15. Apparatus according to claim 10, wherein the temperature equalizing channel (15) is disposed with an upward inclination to the horizontal toward the granulator (6).

16. Apparatus according to claim 10, wherein the temperature equalizing channel (15) is of vibrating design.

17. Apparatus according to claim 10, wherein the length of the temperature equalizing channel (15) is such that the temperature of each plastic strands (4) across its cross section is largely equalized at a temperature over 100° C. during its holding time in the temperature equalization zone (9).

18. A method for granulating plastic strands which emerge from nozzles (3) in molten form, comprising the steps of:

supplying the molten strands (4) to a downwardly inclined runoff channel (1);

cooling and transporting the plastic strands (4) within the runoff channel (1) by a water stream;

dewatering the plastic strands (4) in a dewatering zone (1b) of the runoff channel (1);

transporting the plastic strands (4) coming from the runoff channel (1) through a temperature equalization zone (9) comprising a temperature equalizing channel (15) toward a granulator (6) disposed after the temperature equalization zone (9) by means of a transport roll system (16) having a gap (5) for engaging and advancing the plastic strands (4);

equalizing temperature differences across the cross-section of the plastic strands (4) by moving the dewatered plastic strands (4) along a minimum length of the temperature equalizing channel (15) without adding external heat sufficient to cause the plastic strands to each reach an equalized temperature across their respective cross-section to be in condition for granulation; and granulating the plastic strands (4) with the granulator (6) disposed after the temperature equalization zone (9).

19. The method for granulating plastic strands (4) according to claim 18, further comprising the step of:

transporting the plastic strands (4) through the temperature equalization zone (9) via integrated transport rolls (16', 16") comprising the transport roll system (16).

20. The method for granulating plastic strands (4) according to claim 18, further comprising the step of:

selecting a height of the gap (5) of the transport roll system (16) such that the plastic strands (4) are engaged and given a feeding force toward the granulator (6) by frictional engagement but without essential deformation of the strands.

21. The method for granulating plastic strands (4) according to claim 18, further comprising the step of:

aligning the temperature equalization zone (9) such that the plastic strands (4) pass therethrough essentially horizontally.

22. The method for granulating plastic strands (4) according to claim 18, further comprising the step of:

aligning the tempering zone (9) such that the plastic strands (4) pass therethrough at an upward inclination toward the granulator (6).

23. The method for granulating plastic strands (4) according to claim 18 further comprising the step of:

vibrating the plastic strands in the tempering zone (9).

24. The method for granulating plastic strands (4) according to claim 18 such that the temperature differences of each plastic strand (4) across each strand's cross-section is largely equalized at a temperature over 100° C. during each strand's holding time in the temperature equalization zone (9).

* * * * *